United States Patent
Rajamanickam et al.

(10) Patent No.: US 12,530,457 B2
(45) Date of Patent: Jan. 20, 2026

(54) SECURE INTRUSIVE AND NON-INTRUSIVE REAL-TIME DIAGNOSTICS ACROSS SECURE PERIMETERS

(71) Applicant: TEXAS INSTRUMENTS INCORPORATED, Dallas, TX (US)

(72) Inventors: Karthikeyan Rajamanickam, Bangalore (IN); Venkatesh Natarajan, Bangalore (IN); David P. Foley, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/661,021

(22) Filed: May 10, 2024

(65) Prior Publication Data

US 2025/0013747 A1 Jan. 9, 2025

Related U.S. Application Data (60) Provisional application No. 63/524,945, filed on Jul. 5, 2023.

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC ............. G06F 21/566; G06F 2221/034; G06F 11/3027; G06F 11/3048
See application file for complete search history.

(56) References Cited

U.S. PATENT DOCUMENTS

| | | | | |
|---|---|---|---|---|
| 5,590,345 A | * | 12/1996 | Barker | G06F 9/3889 712/15 |
| 6,986,052 B1 | * | 1/2006 | Mittal | G06F 21/602 713/189 |
| 10,817,395 B2 | | 10/2020 | Natarajan et al. | |
| 2006/0212679 A1 | * | 9/2006 | Alfano | G06F 13/385 712/38 |
| 2013/0090745 A1 | * | 4/2013 | Frazer | G05B 19/0421 700/12 |

(Continued)

OTHER PUBLICATIONS

Texas Instruments Incorporated, "Embedded Real-Time Analysis and Response for Control Applications," Application Report, SPRACM7, Dec. 2020, pp. 1-8.

(Continued)

*Primary Examiner* — Mahfuzur Rahman
(74) *Attorney, Agent, or Firm* — Xianghui Huang; Frank D. Cimino (57) ABSTRACT

Systems and methods may include bus monitoring hardware logic, where that bus monitoring hardware logic may monitor signals on one or more buses of processing unit, such as a central processing unit (CPU). Security logic may associate portions of code with code segregation units, such as links, stacks, and zones. Gating logic in the bus monitoring hardware logic may then enable or disable a monitoring function for a read or write access request based upon a link, stack, or zone identity associated with the piece of code making the read or write access request.

20 Claims, 8 Drawing Sheets

(56) References Cited

U.S. PATENT DOCUMENTS

| | | | | |
|---|---|---|---|---|
| 2014/0129767 A1* | 5/2014 | Ramanujan | ......... | G06F 12/0895 |
| | | | | 711/105 |
| 2014/0281240 A1* | 9/2014 | Willhalm | ............ | G06F 12/0815 |
| | | | | 711/135 |
| 2014/0297919 A1* | 10/2014 | Nachimuthu | ....... | G06F 12/0804 |
| | | | | 711/102 |
| 2014/0304475 A1* | 10/2014 | Ramanujan | ........... | G06F 1/3275 |
| | | | | 711/135 |
| 2022/0027194 A1* | 1/2022 | Damani | ................ | G06F 9/4881 |
| 2024/0329864 A1* | 10/2024 | Das | ........................ | G06F 3/0613 |
| 2024/0329879 A1* | 10/2024 | Das | ........................ | G06F 3/0604 |
| 2025/0013747 A1* | 1/2025 | Rajamanickam | ..... | G06F 21/566 |

OTHER PUBLICATIONS

Texas Instruments Incorporated, "A Technical Introduction to the TMS320F28004x Microcontroller," Technical Brief, SPRT727A, Mar. 2017, Revised Jan. 2018, pp. 1-15.

* cited by examiner

| Ownership Register Fields | Field Description | Reset values | Access permissions R/W/RO | Description |
|---|---|---|---|---|
| XX | Ownership ID | 00 | R/W<br>Debugger:<br>Read-> Returns current ownership ID<br>Writes -> Allowed only if current value is 00 or 01<br>Application:<br>Read-> Returns current ownership ID<br>Writes -> Allowed only if current value is 00 or 10<br>NOTE: When a 00 gets successfully written, all the rest of control/status registers gets reset/cleared | 00 => NO Owner<br>01 => Debug Owned<br>10 => App Owned<br>11 => Reserved/writes are ignored |
| ZZZZ | Zone ID<br>(Valid only when XX = 10) | 0000 | RO<br>Debugger/Application:<br>Read -> Return current zone value | 0000 => Zone-0<br>0001 => Zone-1<br>0010 => Zone-2<br>0011 => Zone-3<br>All others => Reserved<br>These bits are valid only when, XX = 10 (App owned) |

FIG. 9

SECURE INTRUSIVE AND NON-INTRUSIVE REAL-TIME DIAGNOSTICS ACROSS SECURE PERIMETERS

CROSS-REFERENCE TO RELATED APPLICATIONS

The present application claims the benefit of U.S. Provisional Application 63/524,945, filed Jul. 5, 2023, the disclosure of which is hereby incorporated by reference in its entirety.

TECHNICAL FIELD

The present application is related, generally, to central processing unit (CPU) bus monitoring and, more specifically, to enforcing access protections on CPU bus monitoring.

BACKGROUND

Bus monitors and diagnostic modules, which monitor central processing unit (CPU) activity for events, are used in debugging as well as diagnosis of real-time systems. From a safety and security standpoint, various tasks or code execution sections from the CPU may have different access permissions and privileges. This is typically managed by some form of memory management protection unit. However, there is currently no robust technique for enforcing access permissions on bus monitor modules.

There is a need in the art for more robust access permissions enforcement.

SUMMARY

In one example, an apparatus includes: a central processing unit (CPU) having a first bus that couples the CPU to memory, wherein the CPU is configured to generate a hardware signal identifying a code segregation associated with a portion of code being executed by the CPU; bus monitor hardware logic coupled to the first bus, wherein the bus monitor hardware logic includes a first register, further wherein the bus monitor hardware logic is configured to: receive a first write operation from an application running on the CPU, wherein the first write operation causes a first value to be written to the first register, wherein the first value indicates ownership by the application; write a second value to the first register based on the hardware signal from the CPU, wherein the second value identifies a first code segregation of the application; receive a memory access request on the first bus and a code segregation identification on the hardware signal from the CPU; and determine whether to monitor the memory access request on the first bus based at least in part upon whether the code segregation identification on the hardware signal corresponds to the second value.

In another example, an apparatus includes: a plurality of bus monitor modules coupled to a plurality of buses, wherein a first bus monitor module of the plurality of bus monitor modules is configured to: store application ownership information in a first register; store code segregation ownership information in the first register, wherein the code segregation ownership information corresponds to a first code segregation that is associated with an application, wherein the code segregation ownership information is received on a hardware signal from outside of the first bus monitor module; receive a memory access request, from application code, on a first bus of the plurality of buses; and condition operation of the first bus monitor module based at least in part upon whether the application code is associated with the first code segregation, as indicated by the code segregation ownership information stored in the first register.

In yet another example, a method includes: receiving a first write operation from an application running on a central processing unit (CPU), wherein the first write operation is configured to store application ownership information in a first register of bus monitor hardware logic; storing code segregation ownership information in the first register, including receiving the code segregation ownership information on a hardware signal from the CPU; receiving an access request from application code executing on the CPU; receiving information on the hardware signal associating the access request with a first code segregation; and either allowing or denying monitoring of the access request based on whether the code segregation ownership information indicates the first code segregation.

BRIEF DESCRIPTION OF THE DRAWINGS

Having thus described the invention in general terms, reference will now be made to the accompanying drawings, wherein:

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Various embodiments provide systems and methods to enforce access permissions on debug probe hardware such as bus monitor modules. In one example, a central processing unit (CPU) has a bus that couples the CPU to memory.

In fact, the CPU may have multiple buses, such as a data bus, a program counter bus, and an address bus. One or more of the buses may be coupled to memory either directly or indirectly. The CPU is configured also to generate a hardware signal identifying a zone associated with a portion of code being executed by the CPU.

Continuing with the example, bus monitor hardware logic is coupled to the bus and may be used to monitor for debug events, such as a given set of values being present on the bus. An example of bus monitor hardware logic may include an enhanced bus comparator (EBC) or other hardware logic that may generate monitor information from CPU bus signals. The bus monitor hardware logic may include a first register to store ownership information and access information for the bus hardware logic. The bus monitor hardware logic may be configured to receive a write operation from an application running on the CPU. The write operation causes a first value to be written to the first register to indicate ownership by the application. When the bus monitor logic is owned by an application, other applications may be prevented from utilizing or reading the bus monitor hardware logic. Examples of other ownership may include debugger ownership or no ownership.

The bus monitor hardware logic may also be configured to write a second value to the first register. In one example, the bus monitor hardware logic receives the hardware signal that identifies a zone, and the bus monitor hardware logic may store the zone identifier as the second value in the first register. In this manner, the bus monitor hardware logic may store the zone identifier not under control of the application itself, but rather based on the hardware signal output by the CPU. The zone information may be used to permit other applications within the same zone as the owning application to utilize or read the bus monitor hardware logic and may be used to limit the bus monitor hardware logic to only analyzing bus transmissions associated with the same zone.

Subsequently, the bus monitor hardware logic may receive a memory access request on the first bus. The memory access request may include a read or a write operation from the CPU to the memory. The bus monitor hardware logic may also receive information on the hardware signal that identifies a zone that is associated with a portion of the application code being executed. The bus monitor hardware logic may compare the zone identifier from the hardware signal to the second value stored in the first register. The bus monitor hardware logic may determine whether to monitor the memory access request based at least in part upon whether the zone identification on the hardware signal corresponds to the second value. For instance, if the zone identification matches the second value, then the bus monitor hardware logic may monitor the memory access request. On the other hand, if the zone identification does not match the second value, then the bus monitor hardware logic may not monitor the memory access request.

Further continuing with the example, various embodiments allow for access permissions enforcement based on some segregation, such as by zone. For instance, as the CPU executes code, the context may change. In one example, the context may change from a context associated with link 0, to link 7, to link 2, and on and on. The various links may be associated with zones, and some zones may be associated with multiple links. In the example above, if the second value stored in the first register is zone 0, and if the zone identification on the hardware signal indicates something other than zone 0, then the particular piece of code issuing the memory access request may not be monitored by that bus monitor hardware logic.

In another example, the application running on the CPU may release the bus monitor hardware logic from ownership. For instance, the application may write an indication of no ownership as the first value to the first register. Subsequently, a debugger may assert ownership by writing debugger ownership as the first value to the first register. Ownership may change with use and during runtime, development time, or at other appropriate times.

Various embodiments may provide advantages over prior solutions. For instance, the embodiments described herein may allow for segregation-based access permissions. In the example above, a piece of code corresponding to zone 0 would not be allowed to monitor the execution of another piece of code corresponding to zone 1. Therefore, the code corresponding to zone 1 may be kept secure from copying, tampering, or other misuse by actions attributable to code corresponding to zone 0. In other words, various embodiments may provide enhanced security for computer systems.

Additionally, various embodiments may allow for access permissions to be set for individual instances of bus monitor hardware logic. Some systems may include multiple instances of bus monitor hardware logic, such as two, four, 16, or any appropriate number. Each one of the different instances of bus monitor hardware logic may be independently owned and may independently store a zone identification. In other words, the scope of implementations may include a quantity of bus monitor hardware logic instances to be scaled as appropriate Therefore, various embodiments may provide enhanced security while allowing for multiple zones to be monitored during overlapping times.

Of course, while the examples herein describe techniques to enforce access permissions based on zones, the concepts herein may be adapted to other code segregations, such as links, stacks, or the like.

Figure 1:
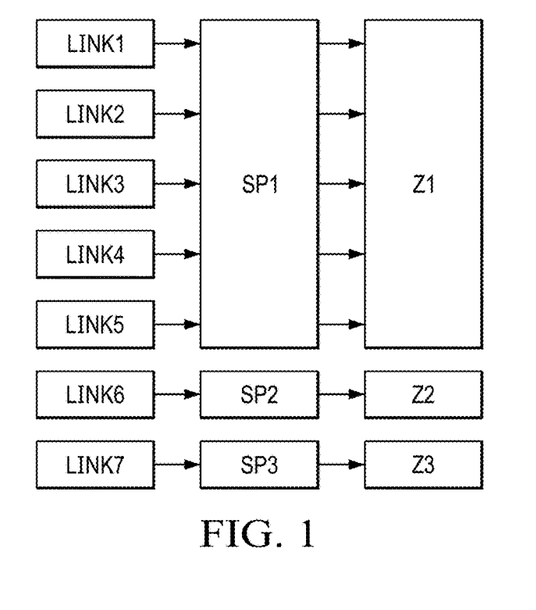
FIG. 1 is an illustration of an example code segregation, according to various embodiments.

FIG. 1 is an illustration of example links, stacks, and zones, according to various embodiments. In the present example, there are seven links, link 1-link 7. There are three stacks (SP), stack 1-stack 3. There are also three zones (Z), zone 1-zone 3.

Each one of the links is a collection of address ranges. For instance, there may be one or more memories, such as on-chip flash, that store machine code instructions and data for execution. Each link refers to an address range or multiple address ranges of the machine code instructions and data. During execution, a link may be referred to as a context.

A stack is a concept in some programming languages (such as C programming), and it also refers to address ranges. In C programming and some other programming languages, a stack is a data structure that follows the Last In, First Out (LIFO) principle. The stack is used for managing function calls, local variables, and maintaining the program's execution. For example, when a function is called, its local variables and the return addresses are pushed onto the stack. When the function completes, these values are popped off the stack. In another example, the stack is used to keep track of where the program is in its execution and to manage the flow of control between different parts of the program. In some examples, more than one program may share a given stack, and each stack may be associated with one or more links.

Zones are a segregation concept for development. For instance, a processor may have access enforcement, where some users are able to access some zones, but not other zones, and user permissions may be different among different users. As illustrated in FIG. 1, links 1-5 are all associated with stack 1. Stack 1 is associated with zone 1. Link 6 is associated with stack 2, which is associated with zone 2. Link 7 is associated with stack 3, which is associated with zone 3. The scope of embodiments may include zone 3 being configured for use only by a manufacturer of a device. Furthermore, the scope of embodiments may include zone 2 having some other lesser security, such as being configured for use by the manufacturer as well as by some trusted downstream business partners. Additionally, the scope of embodiments may include zone 1 having even lesser security, such as being open to various authorized third-party application programmers. In such embodiments, the authorized third-party application programmers would not be able to access zone 2 or zone 1.

Put another way, links may act as a memory protection unit for memory and peripherals. Stacks may complete a hardware context separation. Zones may govern development time segregation, such as for debugging, firmware updates, security updates, and the like. The number of links, stacks, and zones may vary from device to device, so that the number of links, stacks, and zones of FIG. 1 is for illustration purposes.

The relationships between links, stacks, and zones may be defined using information in registers. For instance, a security control unit (e.g., as in FIG. 2) may include a multitude of registers with information to define links, stacks, and zones.

Figure 2:
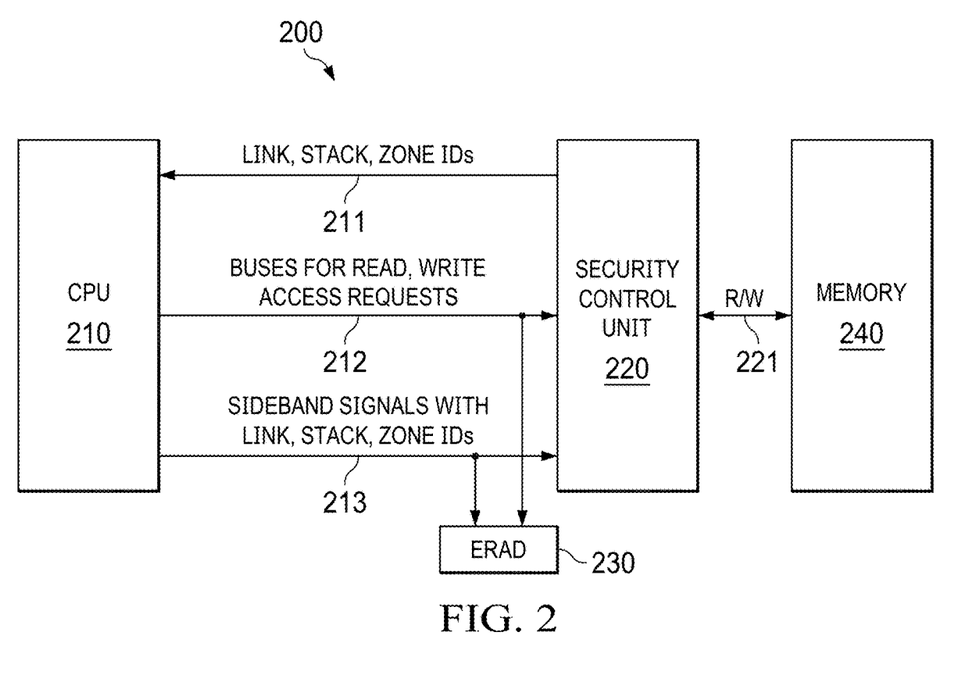
FIG. 2 is an illustration of an example system for CPU bus monitoring, according to various embodiments.

FIG. 2 is an illustration of example system 200, according to various embodiments. System 200 may be implemented on one or more semiconductor dies. For instance, the CPU 210, the security control unit 220, and the memory 204 may be implemented as a system on-chip (SOC) or may be implemented using one or more separate dies in a semiconductor package. One example use case is an embedded system, such as an advanced microcontroller unit (MCU), which may be intended for use in an automobile, an industrial machine, or the like. However, the scope of implementations is not limited to any particular use case, such as an embedded system or otherwise.

CPU 210 may be a general-purpose CPU, a reduced instruction set computer (RISC), an application-specific integrated circuit (ASIC), a graphics processing unit (GPU) or any other appropriate processing unit. CPU 210 fetches instructions and data from memory 240 and then executes those instructions using a processing pipeline. A processing pipeline may include, e.g., a fetch stage, a decode stage, a read stage, an execute stage, a write stage, and/or the like. The processing pipeline is not limited to any specific implementation.

The security control unit 220 enforces access permissions of the memory 240. For instance, the CPU 210 may send a read access request on bus 212 to the security control unit 220. The security control unit 220 may determine whether the read or write access request conforms to the access permissions and may then either allow or deny the access request.

Memory 240 may be an on-chip memory, an off-chip memory, a group of different memory devices, or any appropriate memory. In this example, memory 240 includes a plurality of memory regions to which the CPU 210 may read or write through a plurality of read or write operations 221. The security control unit 220 may include an array of registers, which store information defining zones, stacks, and links and may facilitate access permissions enforcement.

In one example, the CPU fetches instructions and data from memory 240, e.g., on-chip flash. The instructions and data are written to a particular address range, where that particular address range corresponds to a link, such as discussed above with respect to FIG. 1. The security control unit 220 monitors the instruction bus (e.g., in buses 212) for a fetch of the instructions and/or data, parses the information in the fetch, and determines that the fetch corresponds to a particular link, stack, and zone. The security control unit 220 then passes link identification, stack identification, and zone identification information back to the CPU 210 using hardware signal 211.

Continuing with the example, the CPU begins processing the instructions and data according to its processing pipeline. The processing pipeline may include one or more read or write access requests on buses 212. The CPU 210 may include link identification, stack identification, and zone identification information in a hardware signal on buses 212 and/or in hardware signal 213. For example, the CPU may pass the link identification, stack identification, and zone identification information in the course of subsequent requests for system resources such as requests for ownership of debug probe hardware. The security control unit 220 may then use that link identification, stack identification, and zone identification in signal 213 for purposes of access permissions enforcement. For instance, if the link (which may be referred to as a context during runtime) has access to a particular memory region, then the security control unit 220 may allow the access request; otherwise, the security control unit 220 may deny the access request. A read or write operation, being performed, is illustrated by read write operation 221.

The hardware signals 211, 213 and signals on buses 212 in this example include one or more bits transmitted on one or more buses from one piece of hardware logic to another. The bits may be transmitted in parallel or serially, depending on the particular architecture. Therefore, the communications and actions described with respect to FIG. 9 may be performed without use of firmware or software functionality in some implementations.

System 200 may also include debug probe hardware such as an embedded real-time analysis and diagnostics module (ERAD) 230. ERAD 230 is an advanced bus monitor unit, and it may include a plurality of different hardware units, which are each configured to monitor signals on the buses of CPU 210. For instance, ERAD 230 may monitor a program bus, and data bus, a program counter bus, or any other appropriate bus to detect occurrences of a given value or pattern of values, as explained in more detail with respect to FIG. 4. In the example of FIG. 2, ERAD 230 monitors CPU buses and, thus, has access to read and write requests as well as link, stack, and zone identification information. In the example of FIG. 2, a program bus, and data bus, a program counter bus may be included in buses 212.

Figure 3:
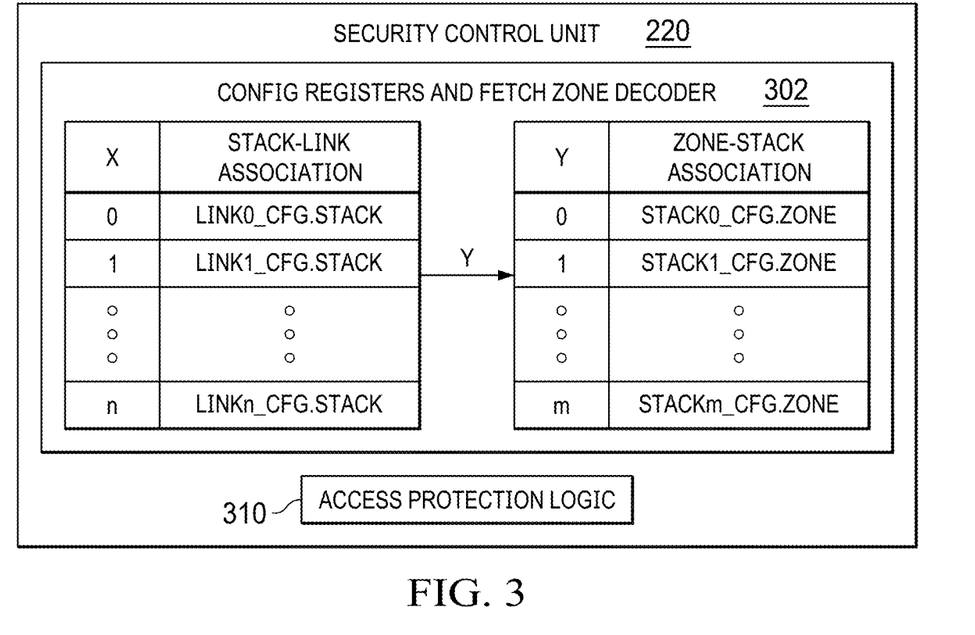
FIG. 3 is an illustration of an example implementation of a security control unit, according to various embodiments.

FIG. 3 is an illustration of an example implementation of security control unit 220, according to various embodiments. Security control unit 220 includes configuration registers and fetch zone decoder 302. Configuration registers and fetch zone decoder 302 includes an array of registers that store information indicating associations between zones and stacks and addresses, stacks, and links. When the CPU 210 fetches an instruction, that fetch may be monitored by the security control unit 220, and the information in the fetch may be used to determine link identification, stack identification, and zone identification information using configuration registers and fetch zone decoder 302. The security control unit 220 may then transmit the link identification, stack identification, and zone identification information on hardware signal 211.

In one example, the CPU 210 may transmit a memory access request (e.g., a read request or a write request) on buses 212 to the security control unit 220. That memory access request on bus 212 may include link identification, stack identification, and zone identification information for a context that is executing or the link, stack, and zone identification information may be determined by the security control unit 220 from a property of the memory access request, such as a target address. The security control unit 220 may then compare the link identification information to permission information (not illustrated) and then either allow or deny read or write access based on the direct access permissions.

Specifically, access protection logic 310 is hardware logic of security control unit 220. Access protection logic 310 may receive hardware signals on buses 212 and hardware signal 213 and then either determine to allow access to a particular memory region or not. Access protection logic 310 may also be configured to enable or disable debug access based on link, stack, and/or zone information, as explained in more detail with respect to FIG. 6.

Figure 4:
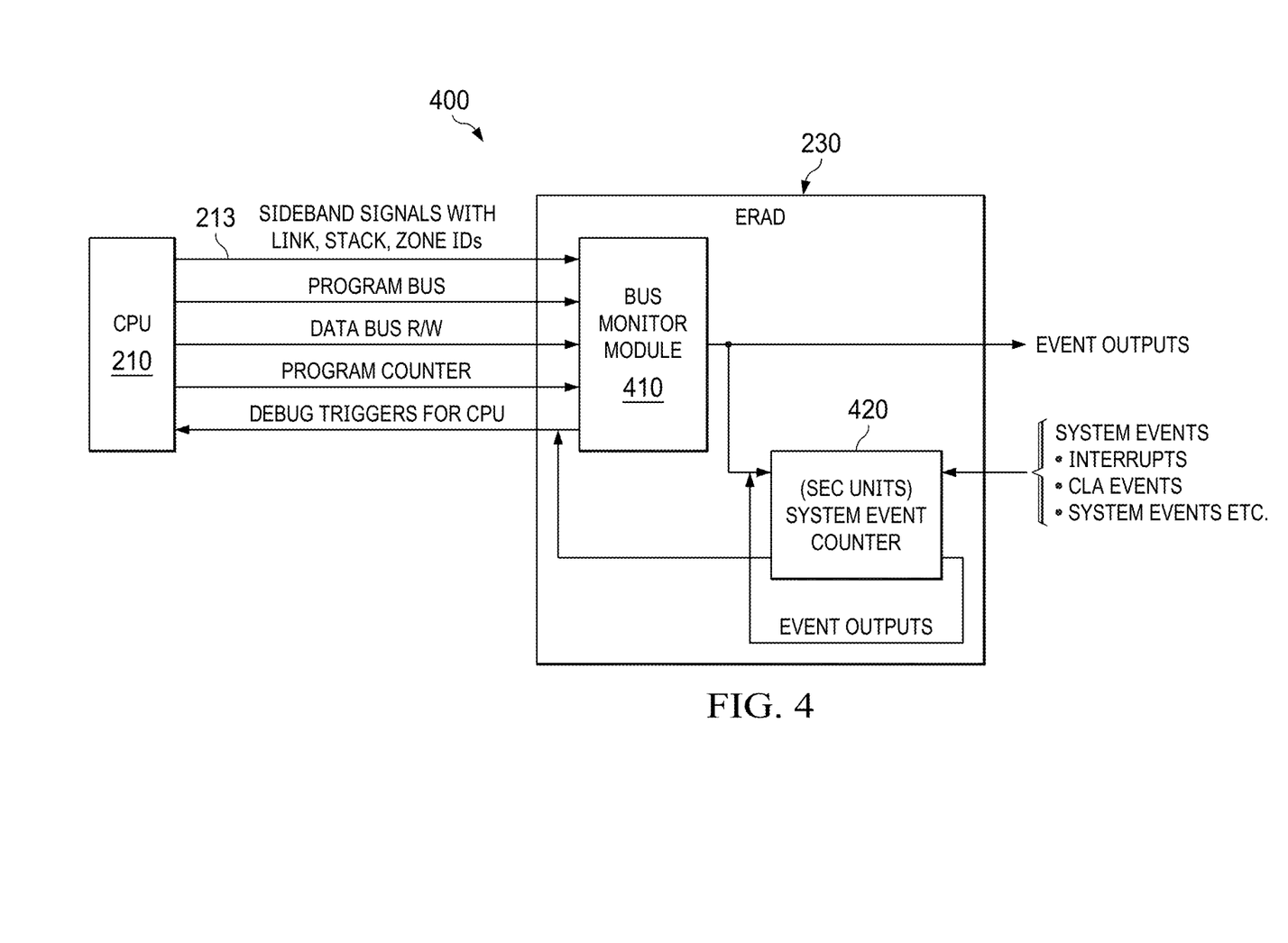
FIG. 4 is an illustration of an example architecture, which includes a CPU and bus monitoring hardware, according to various embodiments.

FIG. 4 is an illustration of example architecture 400, which includes example CPU 210 and example ERAD 230, according to various embodiments. FIG. 4 omits security control unit 220 for ease of illustration, but it is understood that architecture 400 does not exclude security control unit 220.

ERAD 230 includes multiple bus monitor modules (also called enhanced bus comparators, EBCs) and multiple System Event Counters, or SEC units. However, FIG. 4 illustrates a single bus monitor module 410 and a single SEC unit 420 for ease of illustration.

The bus monitor module 410 may be configured to generate hardware breakpoints, hardware watch points, debugging triggers, and other output events based on the information monitored on the CPU buses. For example, the bus monitor module may generate an event every time a given value or pattern of values is detected on the bus. The SEC unit 420 may be configured to analyze and profile the system by counting system events or output events from the bus monitor module 410. The SEC unit 420 may be configured to send debug triggers to the CPU 210.

The bus monitor module 410 may be connected to the CPU 210 through a direct memory interface-like connection. Bus monitor module 410 may monitor the buses connected between itself and the CPU 210—the address bus, data bus, and program counter bus. In bus monitor module 410 itself, a mask can be defined to perform a greater than, less than, or equal to comparison on bus data.

After the information has been received and processed by the bus monitor module 410, bus monitor module 410 may then perform an action, such as providing a command for a debug halt or interrupt. In a scenario in which ERAD 230 is functioning as a debugger, the bus monitor module 410 may be used for generating breakpoints and watch points. Additionally, in application code, the bus monitor module 410 may be used to generate a real-time operating system (RTOS) interrupt or an event output that may be used by other bus monitor modules or SEC units.

The SEC unit 420 may be configured to receive inputs from either the output of the bus monitor module 410 or external system events, such as peripheral interrupt expansion (PIE) interrupts, timer interrupts, and control law accelerator (CLA) task interrupts. The SEC unit 420 may be configured to function as a counter, allowing for benchmark and profiling analysis.

In the example implementation of architecture 400, ERAD 230 is coupled to a bus that transmits hardware signal 213, which includes link, stack, and zone identification information. This link, stack, and zone information may be used to selectively monitor for only those particular bus values that have a designated link, stack, or zone. For example, if a bus monitor module 410 of the ERAD 230 is owned by an application in a given zone, the bus monitor module 410 may be limited to only monitoring for those bus values that match a specified pattern and are also associated with an application in the same zone. This prevents the owning application from monitoring the activities of more secure applications.

In some examples, signal 213 may be a sideband strobe, but the scope of implementations is not limited to any particular format for a hardware signal. ERAD 230 is also coupled to the program bus, the data bus, and the program counter bus. The bus monitor module 410 may receive information from any or all of those buses, may parse and store information from any of those buses, and may take various actions based on the information from any or all of those buses.

In one example, bus monitor module 410 may monitor memory addresses for function calls that include read and write access. Bus monitor module 410 may be programmed to generate an interrupt should a read or write access be directed to a memory address range above a particular address range (e.g., 8000). For instance, read and write access is to address ranges above that particular address range may indicate a stack overflow. Therefore, the bus monitor module 410 may be programmed to generate the interrupt to prevent further malfunction due to a stack overflow. Of course, this is only one example, and bus monitor module 410 may be configured in any appropriate manner.

In some examples, bus monitor module 410 may include hardware logic configured to receive signals on the buses from CPU 210. Furthermore, the hardware logic may be configured with registers into which settings information and control information may be stored, thereby changing a functionality of bus monitor module 410.

Additionally, as noted below, bus monitor module 410 may include hardware logic that is configured to enforce access permissions.

Figure 5:
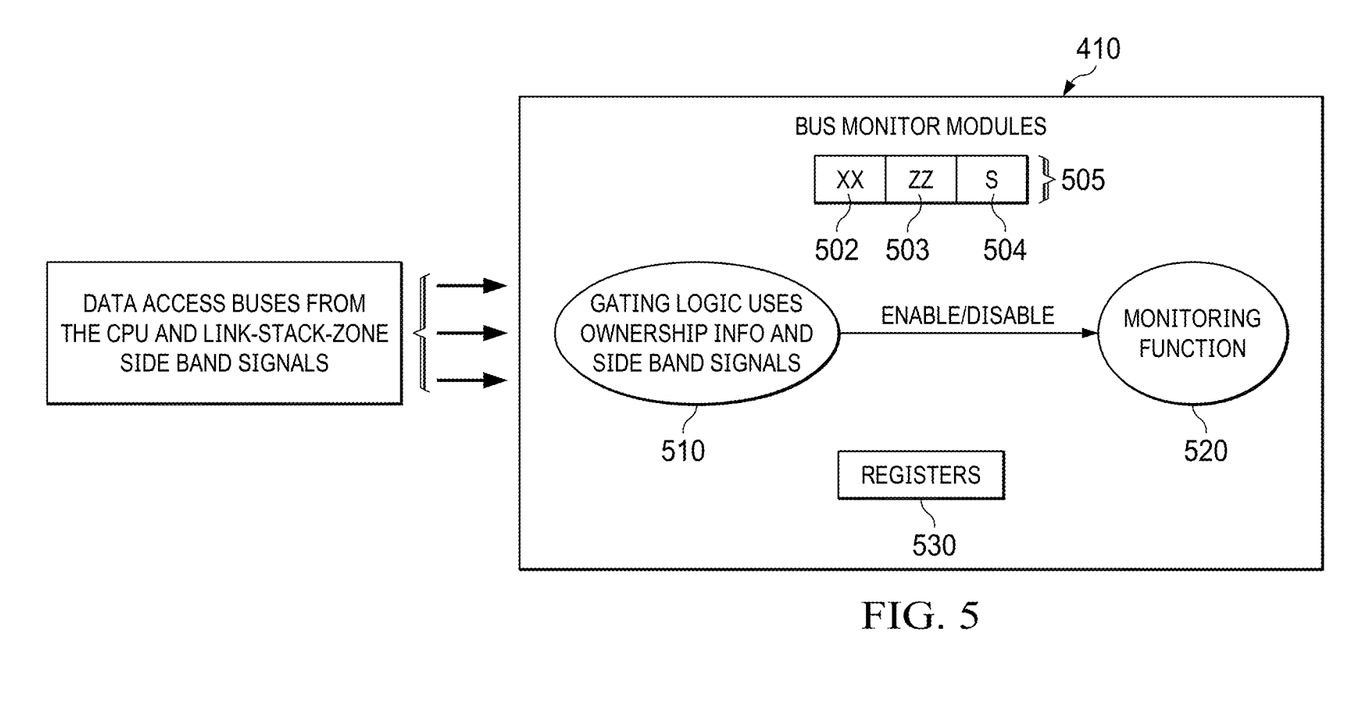
FIG. 5 is an illustration of an example bus monitor module, according to various embodiments.

FIG. 5 is an illustration of example bus monitor module 410, according to various embodiments. As noted above, ERAD 230 may include multiple bus monitor module instances, and bus monitor module 410 is exemplary of one such instance that may be repeated in ERAD 230.

Bus monitor module 410 includes ownership register 505. In an example, ownership register 505 includes three different fields 502-504 therein. Although ownership register 505 is described as one register, it is understood that the scope of implementations may include one or more registers configured to perform the functions of ownership register 505. Furthermore, it is understood that in these examples when a register is discussed, it is understood that the register may be implemented as one or more registers as appropriate.

In this example, the field 502 is referred to as XX; the field 503 may be referred to as ZZ, and the field 504 may be referred to as S.

The field 502 may be referred to as a primary ownership value, indicating a primary ownership mode. In this example, ownership indicates exclusive use, at least until ownership is released. In one example, a value of 00 indicates no owner, a value of 01 indicates ownership by an application, and a value of 10 may indicate ownership by a debugger. When field 502 indicates no owner, application code or a debugger may claim ownership of bus monitor module 410. When field 502 shows ownership by a debugger, application code is not allowed to use bus monitor module 410 unless and until the debugger releases ownership of the bus monitor module 410. When field 502 shows ownership by an application, the debugger cannot use bus monitor module 410 until and unless the application code releases ownership. Furthermore, in this example, when field 502 shows ownership by an application, gating logic 510 performs zone-based checks to enforce access permissions which may include preventing other applications from accessing the bus monitor module 410 and/or preventing the bus monitor module 410 from monitoring requests associated with other applications. Of course, ERAD 230 may include multiple bus monitor module instances, each of which may reflect different ownership information.

The field 503 may be referred to as the zone identification of a current owner. Zones are described above in more detail with respect to FIG. 1. In some examples, one or more of the zones may be associated with a debugger, and one or more zones may be associated with one or more applications. In other words, in some embodiments, only applications may have different contexts. Nevertheless, in some embodiments, the field 503 may be used for gating only when field 502 indicates ownership by an application.

Some embodiments may include a link, which is configured in the architecture to have special privileges and may be referred to as "Secure Root LINK" or SROOT LINK. For instance, one of the links may be designated to have special access privileges greater than any other link. The field 504 may indicate SROOT LINK ownership. In one example, when field 504 stores a particular digital value indicative of SROOT LINK, gating logic 510 may allow all accesses to be monitored without filtering. Hence, if code executing from the SROOT LINK takes ownership of bus monitor module 410, the bus monitor module 410 may be allowed to monitor all bus activities.

During operation, the gating logic 510 may parse the information in the hardware signal 213 to determine link, stack, and zone identifying information. Gating logic 510 may compare that information to the ownership information in register 505 and then either enable or disable the monitoring function 520 based on the comparing.

Figure 6:
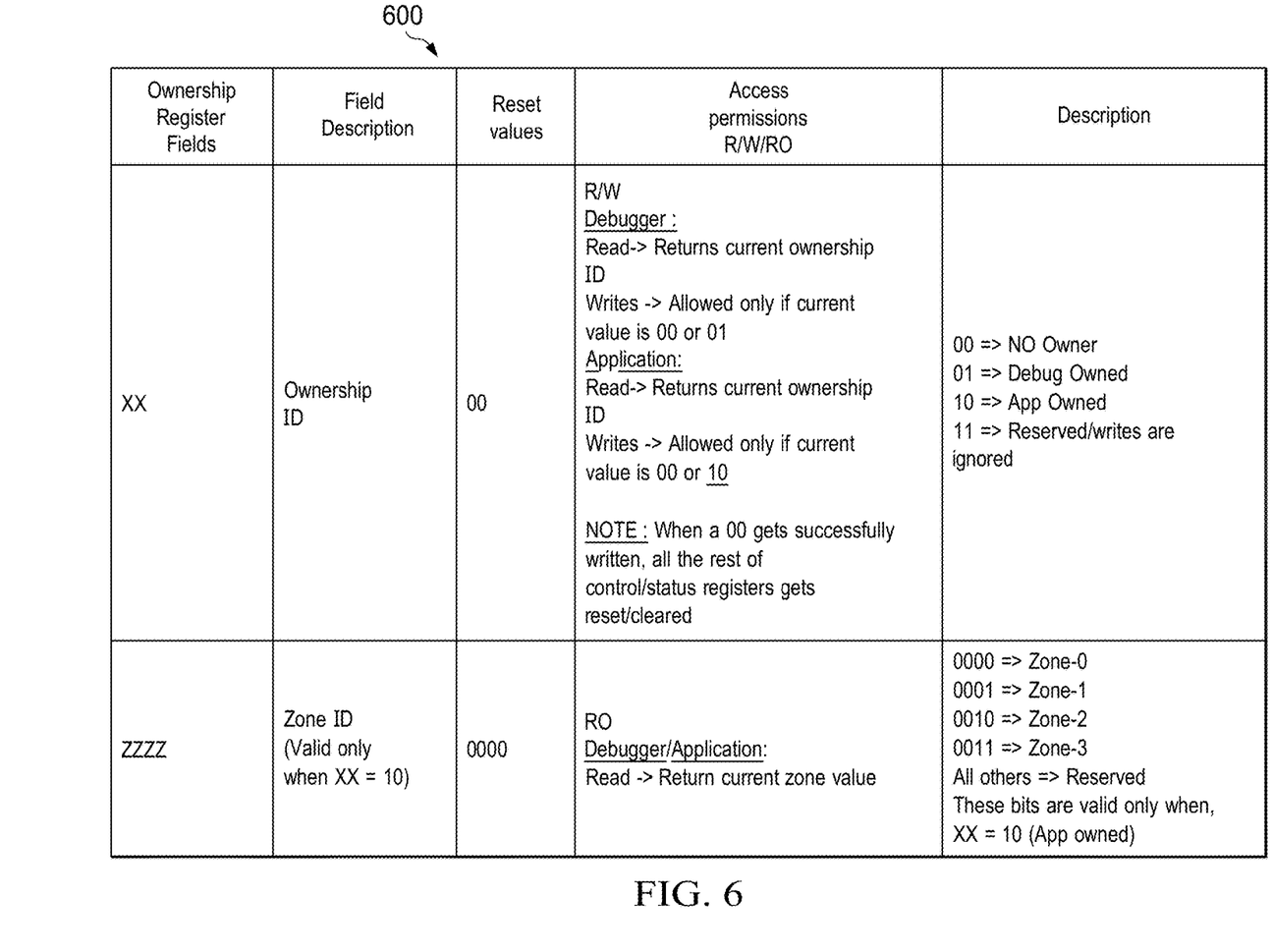
FIG. 6 is an illustration of an example table of operational functionality of gating logic, according to various embodiments.

FIG. 6 is an illustration of example table 600, according to various embodiments. Example table 600 illustrates operational functionality of the gating logic 510 in one specific example. It is understood that different embodiments may use different values in different ways to achieve similar outcomes, so the scope of implementations is not limited to the values and actions of example table 600.

According to table 600, the value 00 indicates no ownership and is also a reset value. When field 502 stores the value 00, an application or a debugger may write to the field 502 to assert ownership on the bus monitor module 410. During debugger ownership, any entity reading field 502 may see ownership by the debugger, and the debugger may write to the field 502 only if the current value is 00 or 01. Similarly, during application ownership, any entity reading field 502 may see the application ownership, and the application may write to the field 502 only if the current value is 00 or 10.

The field 503 is a zone ID, and in this example, it is only used when field 502 shows ownership by an application. The gating logic 510 may populate field 503 based upon the information in signal 213. For instance, during ownership assertion, the signal 213 indicates link, stack, and zone identification information of the piece of code making the ownership assertion. That piece of code may belong to a particular application, an operating system, or the like. In an instance in which an application is writing to the field 502 to assert ownership, the gating logic 510 populates the field 503 with the zone identification from signal 213. This action may be performed without involvement of an operating system being executed on CPU 210 or an application being executed on CPU 210.

In short, table 600 indicates that when the bus monitor module 410 is in a no owner state, the registers are not writable without claiming ownership first. When the block is owned by the debugger, there may be no security implications to program the bus monitor module 410 registers by the debugger itself. When the block is owned by an application, then only an access originating from the respective zone owning the bus monitor module 410 may write ownership register 505 of the bus monitor module 410.

However, gating logic 510 may be programmed such that bus monitor module security is based on the granularity of zones with the exception of the SROOT LINK. For example, if bus monitor module 410 is owned by the SROOT LINK, then gating logic 510 may allow monitoring. Further in this example, valid accesses may generate triggers irrespective of which zone performed that access, such as any matching access from a particular zone would generate a trigger if bus monitor module 410 is owned by SROOT LINK.

In one example, bus monitor module 410 is not owned, so that field 502 stores 00, and field 503 stores 0000. A debugger then attempts to assert ownership on the bus monitor module 410. The debugger may write 01 to the field 502 because writes are permitted when the existing value in field 502 is 00. The write operation to field 502 is successful, and field 503 remains at 0000. Logic on the bus monitor module 410 (e.g., logic 510, or perhaps software logic, not shown) reads back the value in field 502 to confirm that field 502 stores 01 as a value. In other words, ownership is confirmed. The debugger may then configure and start using bus monitor module 410.

During debugger ownership, if an application attempts to write to field 502, gating logic 510 may block that writing access. In one example, when the debugger owns the bus monitor module 410, only those accesses whose corresponding zones are enabled for debug will be monitored by the bus monitor module 410 (i.e., monitoring function 520 enabled). If the code is executing from a zone not enabled for debug, then the bus monitor module 410 operations will be gated off by gating logic 510 (i.e., monitoring function 520 disabled).

The monitoring function 520 of the debugger may include, e.g., comparator operation. As values come across the CPU buses, the comparator operation may then store values to registers 530 based upon results of the comparator operation. For instance, address ranges for read or write operations may be compared to settings or limits, and then monitoring function 520 may store values to registers 530 based upon the comparing. The data stored in registers 530 may be used to generate interrupts or other events, as may be configured in monitoring function 520.

Once the debugger completes its work, it may de-assert ownership by writing 00 to the field 502. When the write is successful, field 502 stores 00, and field 503 continues to store 0000.

Now continuing with the example, an application attempts to assert ownership on the bus monitor module 410. In this example, the actions of the application are carried out by a portion of code, corresponding to a context (or link) that is associated with a zone. For purposes of this example, the zone is zone 2. The application writes 10 to the field 502, and the write operation is valid since the existing value in field 502 is 00. Once the write operation to field 502 is successful, the gating logic 510 uses the zone ID information from the signal 213 to populate field 503. For example, zone 2 may correspond to a value of 0010 in field 503. Once again, logic internal to the bus monitor module 410 may populate field 503, based on information in hardware signal 213, without interference or influence by code running on the CPU 210. Logic in the bus monitor module 410 reads back the value stored in field 502 and confirms ownership. The application code from zone 2 now configures and starts using the bus monitor module 410. As noted above, the application code may configure the monitoring function 520 and cause the monitoring function to perform monitoring on the bus signals from the CPU.

During ownership by the application, if application code from another zone (e.g., zone 3, attempts to write to field 502, gating logic 510 would block that access as invalid. Furthermore, during ownership by the application, if a debugger tries to write to field 502, gating logic 510 would also block that access. Once the application code corresponding to zone 2 has finished its work, then it may release ownership by writing the value 00 to field 502. Once the write operation is successful, field 502 stores 00, and gating logic 510 automatically resets the value in field 503 to 0000. The bus monitor module 410 is then in the default mode, unowned, and waiting for ownership assertion by application code or a debugger.

Figure 7:
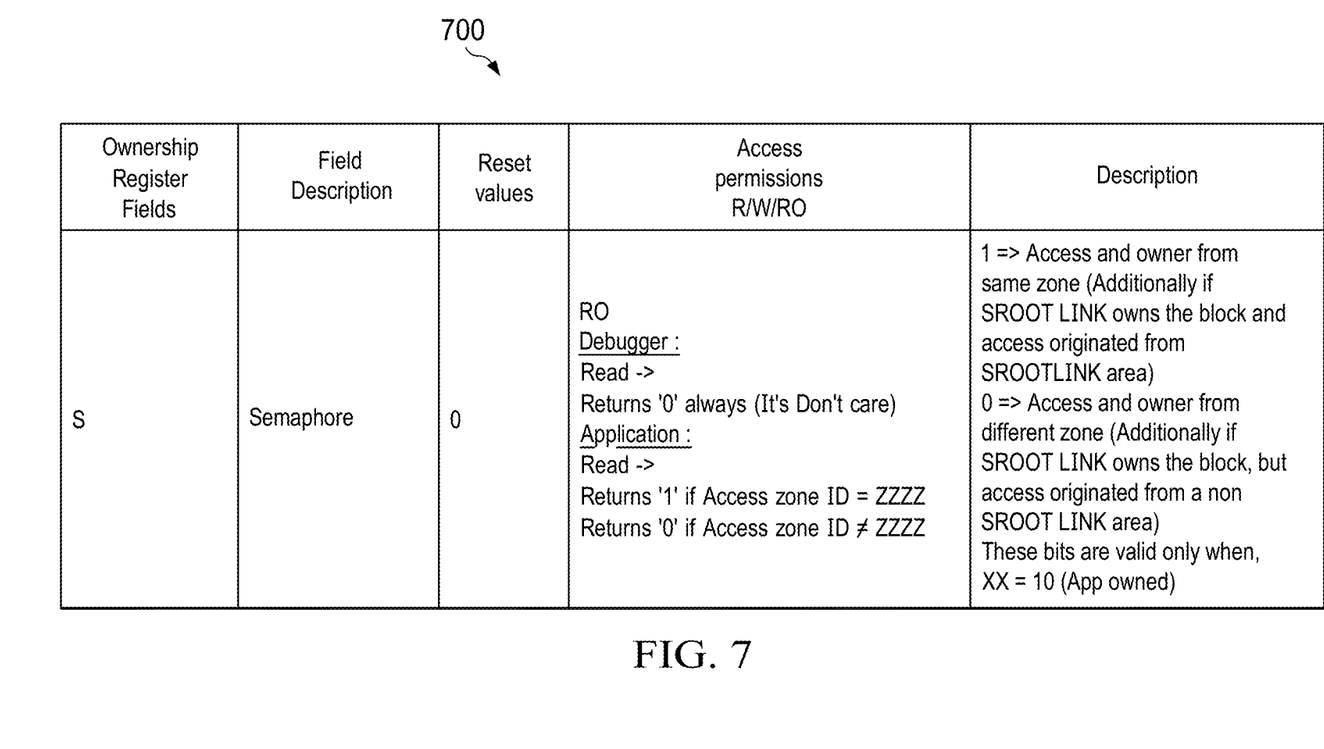
FIG. 7 is an illustration of an example table of a semaphore register to indicate ownership status, according to various embodiments.

FIG. 7 is an illustration of example table 700, according to various embodiments. Various embodiments employ a semaphore register to indicate ownership status. In this manner, a portion of code that is running on the CPU, and belongs to an application, may identify or reconfirm whether a particular bus monitor module belongs to the zone corresponding to the portion of code. Accordingly, field 504 may be used for the semaphore register. For a read operation by a debugger, the field 504 may always return a value of 0 in embodiments in which zone information is irrelevant during debugger ownership. However, in embodiments when zone information is not irrelevant during debugger ownership, debugger reads may perform similarly to application reads. An example of an application read operation of field 504, the operation returns a 1 if the access zone ID matches and returns a 0 if the access zone ID does not match. In one example, gating logic 510 may read the zone ID information from hardware signal 213 and compare it to field 503 and then populate field 504 based upon that comparison.

Figure 8:
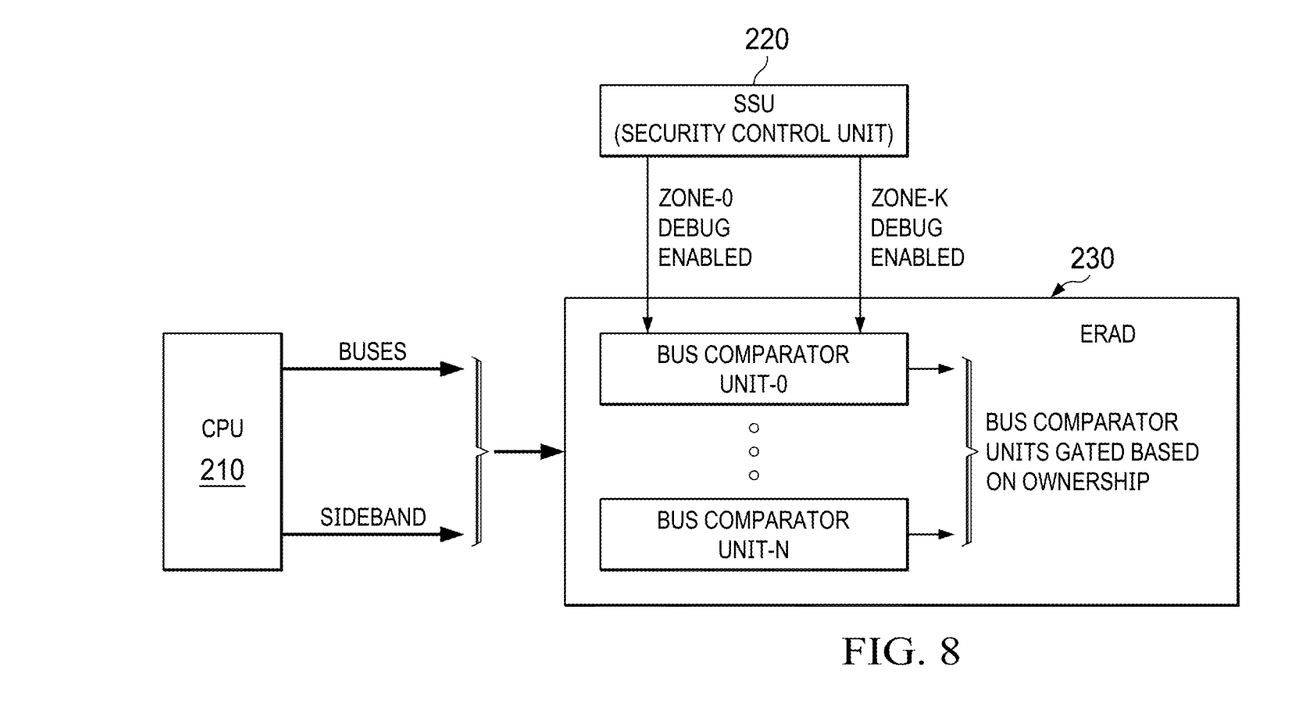
FIG. 8 is an illustration of an example architecture, according to various embodiments.

FIG. 8 is an illustration of example architecture 800, according to various embodiments. In architecture 800, ERAD 230 is illustrated as including a multitude of bus comparator units 0 . . . . N, corresponding to instances of EBC units, such as bus monitor module 410.

In the example of architecture 800, the ERAD 230 is coupled to the CPU buses (e.g., data bus, address bus, the program counter bus) as well as to a bus carrying a hardware signal 213, such as a sideband signal. Each of the bus comparator units may include gating logic 510, an ownership register 505, a monitoring function 520, and registers 530, such as discussed above with respect to FIG. 5. Furthermore, some embodiments, such as in architecture 800, may perform writes on behalf of a debugger via security control unit 220. Specifically, read and write operations to ownership register 505 may be performed by SSU 220 when the read and write operations are performed on behalf of the debugger. In other words, SSU 220 may be configured to perform read operations and write operations as appropriate and on behalf of other entities, such as a debugger.

Figure 9:
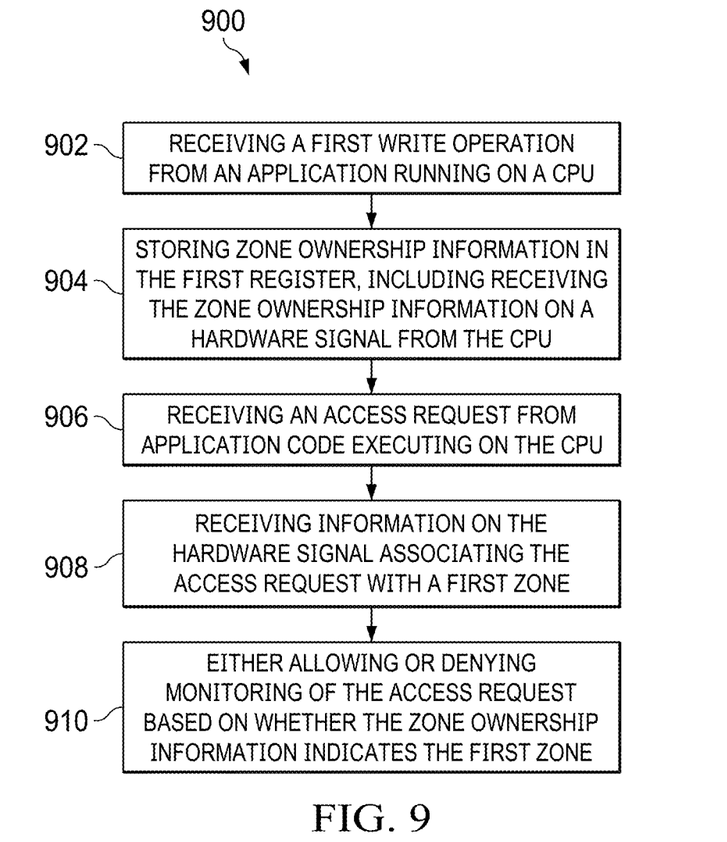
FIG. 9 is an illustration of an example method for enforcing access permissions in bus monitoring, according to various embodiments.

FIG. 9 is an illustration of an example method 900, for enforcing access permissions in bus monitoring, according to various embodiments. The actions of method 900 may be performed by bus monitor hardware logic, such as bus monitor module 410. In one example, the hardware logic is implemented using aggregations of logic gates into one or more logic units, where those logic units are in communication with buses to receive hardware signals and to transmit hardware signals. Such actions may not require intervention by software or firmware in this example.

At action 902, the bus monitor hardware logic receives a first write operation from an application running on a CPU. For instance, the first write operation may include an attempt at establishing ownership, such as by writing a value to an ownership register. For instance, an application may establish ownership by writing 10 to the field 502 in the example of FIGS. 5-7.

At action 904, the bus monitor hardware logic may then store zone ownership information in the first register. In one example, the bus monitor hardware logic may receive zone identifying information in a hardware signal, such as hardware signal 213. The bus monitor hardware logic may then populate field 503 with the zone identifying information, according to the examples of FIGS. 5-7.

At action 906, the bus monitor hardware logic receives an access request from application code executing on the CPU. For instance, the access request may be directed to memory, and the bus monitor hardware logic may non-intrusively parse the information in the access request. In the example of FIG. 4, the access request may be transmitted on one or more of a program bus, a data bus, or a program counter bus. However, the scope of implementations is not limited to any particular bus.

At action 908, the bus monitor hardware logic may receive information on the hardware signal associating the access request with the first zone. In the example of FIG. 2, the hardware signal 213 carries link, stack, and zone identification information concurrent with an access request, thereby identifying a piece of code making the access request. Continuing with the present example, the bus monitor hardware logic may parse information on the hardware signal 213, which identifies among other things a zone associated with a portion of code making the access request of action 906.

At action 910, the bus monitor hardware logic may then either allow or deny monitoring of the access request based on whether the zone ownership information indicates the first zone. For instance, the zone ownership information of action 904 was stored to the first register, and the bus monitor hardware logic may then compare the information from action 908 to the zone ownership information stored at action 904. In the case of a match, the bus monitor hardware logic may then allow monitoring. In the case of a mismatch, the bus monitor hardware logic may then deny monitoring.

In an example of allowing or denying monitoring, FIG. 5 illustrates that gating logic 510 may perform the comparing and then either enable or disable monitoring functionality 520. The monitoring functionality may include any appropriate functionality, such as comparator functionality and register writing functionality based on information on the CPU buses. The gating logic 510 may perform the comparison and then enable or disable the monitoring function 520 based upon ownership information in register 505 and information transmitted on the hardware signal (e.g., hardware signal 213). The gating logic 510 may perform these actions without influence from the portion of code running on the CPU. In other words, the gating logic 510 may allow or deny monitoring in a way that may not be influenced by the application itself. Various embodiments may provide a benefit to computer systems by increasing security, including removing monitoring functions from the influence or control of an application, at least in some instances.

The scope of implementations is not limited to the specific series of actions shown in FIG. 5. Rather, some implementations may add, omit, rearrange, or modify one or more of the actions. In one example, method 900 may include actions performed by the CPU. For instance, the CPU may receive link, stack, and zone identification information from the security control unit and then transmit the link, stack, and zone identification information with each access request. The CPU may also execute portions of code, and the portions of code may include functionality to write ownership to the ownership register 505 as appropriate.

Furthermore, various embodiments may include actions by a debugger to establish ownership. For instance, after the application relinquishes ownership of the bus monitor hardware logic, the debugger may attempt to establish ownership of the bus monitor hardware logic. The debugger may then configure the bus monitor hardware logic and, once work is complete, then relinquish ownership.

Additionally, while method 900 is discussed with respect to one instance of bus monitor hardware logic, some architectures may include multiple instances of bus monitor hardware logic, such as shown in FIG. 8 in which ERAD 230 includes N instances of bus comparator units. Each of those instances of bus monitor hardware logic may operate independently and concurrently.

Additionally, a particular instance of bus monitor hardware logic may repeat the actions of method 900. For instance, the CPU may execute portions of code corresponding to different links and zones and may switch between portions of code, such as when a context makes a function call to another context. The ownership of the instance of bus monitor hardware logic may or may not change as the portions of code that are being executed change. However, as portions of code are executed, some of those portions of code may establish ownership and relinquish ownership of the particular instance of bus monitor hardware logic, thereby resulting in performing method 900.

Moreover, the bus monitor hardware logic may perform the monitoring, assuming that monitoring is allowed at action 910. The monitoring may include comparing information on the CPU buses to settings and then writing results to one or more registers (e.g., registers 530). The monitoring may or may not result in actions taken, such as generating interrupts or events.

While the examples above are specifically directed to conditioning monitoring based on zone ownership, the scope of implementations may include conditioning monitoring based on any type of code segregation. For instance, in addition to or instead of populating field 503 with a zone identity, ownership register 505 may include a field to be populated by link identity and/or stack identity. Gating logic 510 may then enable or disable the monitoring function 520 based upon link, stack, and/or zone information in signal 213. In other words, while gating logic 510 may enable or disable based upon a zone level of granularity, that granularity may be adapted as appropriate for links and/or stacks.

The term "semiconductor die" is used herein. A semiconductor device can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an A/D converter. The semiconductor device can include passive devices such as resistors, inductors, filters, sensors, or active devices such as transistors. The semiconductor device can be an integrated circuit with hundreds or thousands of transistors coupled to form a functional circuit, for example a microprocessor or memory device. The semiconductor device may also be referred to herein as a semiconductor device or an integrated circuit (IC) die.

The term "semiconductor package" is used herein. A semiconductor package has at least one semiconductor die electrically coupled to terminals and has a package body that protects and covers the semiconductor die. In some arrangements, multiple semiconductor dies can be packaged together. For example, a power metal oxide semiconductor (MOS) field effect transistor (FET) semiconductor device and a second semiconductor device (such as a gate driver die, or a controller die) can be packaged together to from a single packaged electronic device. Additional components such as passive components, such as capacitors, resistors, and inductors or coils, can be included in the packaged electronic device. The semiconductor die is mounted with a package substrate that provides conductive leads. A portion of the conductive leads form the terminals for the packaged device. In wire bonded integrated circuit packages, bond wires couple conductive leads of a package substrate to bond pads on the semiconductor die. The semiconductor die can be mounted to the package substrate with a device side surface facing away from the substrate and a backside surface facing and mounted to a die pad of the package substrate. The semiconductor package can have a package body formed by a thermoset epoxy resin mold compound in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions form the terminals for the semiconductor package. The semiconductor package may also be referred to as a "integrated circuit package," a "microelectronic device package," or a "semiconductor device package."

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

What is claimed is:
1. An apparatus comprising:
a central processing unit (CPU) having a first bus that couples the CPU to memory, wherein the CPU is configured to generate a hardware signal identifying a code segregation associated with a portion of code being executed by the CPU;

bus monitor hardware logic coupled to the first bus, wherein the bus monitor hardware logic includes a first register, further wherein the bus monitor hardware logic is configured to:
receive a first write operation from an application running on the CPU, wherein the first write operation causes a first value that associates the bus monitor hardware logic with the application to be written to the first register;
write a second value to the first register based on the hardware signal from the CPU, wherein the second value identifies a first code segregation of the application;
receive a memory access request on the first bus and a code segregation identification from the CPU; and
determine whether to monitor the memory access request on the first bus based at least in part upon whether the code segregation identification corresponds to the second value.

2. The apparatus of claim 1, wherein the bus monitor hardware logic includes an enhanced bus comparator.

3. The apparatus of claim 1, wherein the bus monitor hardware logic is configured to write the second value to the first register without involvement of the application or an operating system running on the CPU.

4. The apparatus of claim 1, wherein the bus monitor hardware logic is further configured to:
accept the first write operation based upon whether the first register stores information indicating no ownership.

5. The apparatus of claim 1, wherein the bus monitor hardware logic is further configured to:
receive a second write operation from the application, wherein the second write operation is configured to replace the first value with an indication of no ownership.

6. The apparatus of claim 5, wherein the bus monitor hardware logic is further configured to:
receive a third write operation from a debugger, wherein the third write operation causes a third value to overwrite the indication of no ownership in the first register, wherein the third value indicates ownership by the debugger.

7. The apparatus of claim 1, wherein the bus monitor hardware logic is further configured to:
allow, as part of monitoring the memory access request on the first bus, reading or writing to a second register of the bus monitor hardware logic based on information in the hardware signal.

8. The apparatus of claim 1, wherein the first bus comprises at least one of a data bus, an address bus, or a program counter bus.

9. The apparatus of claim 1 wherein the bus monitor hardware logic is further configured to:
monitor the memory access request on the first bus; and
generate an interrupt based on monitoring the memory access request.

10. The apparatus of claim 1, wherein the first code segregation comprises a zone, which is associated with a context that generated the memory access request.

11. The apparatus of claim 10, wherein the zone is associated with a stack, and wherein the context is associated with the stack.

12. An apparatus comprising:
a plurality of bus monitor modules coupled to a plurality of buses, wherein a first bus monitor module of the plurality of bus monitor modules is configured to:
store application ownership information in a first register;
store code segregation ownership information in the first register, wherein the code segregation ownership information corresponds to a first code segregation that is associated with an application;
receive a memory access request, from application code, on a first bus of the plurality of buses; and
condition operation of the first bus monitor module based at least in part upon whether the application code is associated with the first code segregation, as indicated by the code segregation ownership information stored in the first register.

13. The apparatus of claim 12, wherein the first bus monitor module is further configured to:
receive an identifier of the first code segregation concurrently with receiving the memory access request.

14. The apparatus of claim 13, wherein the first bus monitor module is further configured to:
compare the identifier of the first code segregation to the code segregation ownership information stored in the first register; and
allow the first bus monitor module to monitor the memory access request in response to determining that the identifier of the first code segregation matches the code segregation ownership information stored in the first register.

15. The apparatus of claim 12, wherein the first bus monitor module is further configured to:
receive an identifier of a second code segregation concurrently with receiving the memory access request;
compare the identifier of the second code segregation to the code segregation ownership information stored in the first register; and
disable monitoring functionality of the first bus monitor module in response to determining that the identifier of the second code segregation does not match the code segregation ownership information stored in the first register.

16. A method comprising:
receiving a first write operation from an application running on a central processing unit (CPU), wherein the first write operation is configured to store application ownership information in a first register of bus monitor hardware logic;
storing code segregation ownership information in the first register;
receiving an access request from application code executing on the CPU;
receiving information associating the access request with a first code segregation; and
either allowing or denying monitoring of the access request based on whether the code segregation ownership information indicates the first code segregation.

17. The method of claim 16, comprising:
denying monitoring of the access request based on the code segregation ownership information indicating other than the first code segregation.

18. The method of claim 16, comprising:
allowing monitoring of the access request based on the code segregation ownership information indicating the first code segregation.

19. The method of claim 16, wherein the first code segregation comprises a zone, which is associated with a context that generated the access request.

20. The method of claim 19, wherein the zone is associated with a stack, and wherein the context is associated with the stack.

\* \* \* \* \*